(12) United States Patent
Wexler et al.

(10) Patent No.: US 10,641,636 B1
(45) Date of Patent: May 5, 2020

(54) GRADUATED MOP LIQUID MEASUREMENT PITCHER WITH EASILY GRASPABLE HANDLE

(71) Applicant: Medline Industries, Inc, Northfield, IL (US)

(72) Inventors: Paige Wexler, Highland Park, IL (US); Tamara Dick, Fox Lake, IL (US); Steve McNabb, Kenosha, WI (US); Shiny Chacko, Ingleside, IL (US)

(73) Assignee: Medline Industries, Inc., Northfield, IL (US)

(*) Notice: Subject to any disclaimer, the term of this patent is extended or adjusted under 35 U.S.C. 154(b) by 0 days.

(21) Appl. No.: 16/185,076

(22) Filed: Nov. 9, 2018

Related U.S. Application Data

(60) Provisional application No. 62/752,741, filed on Oct. 30, 2018.

(51) Int. Cl.
*G01F 19/00* (2006.01)
*A47L 13/50* (2006.01)

(52) U.S. Cl.
CPC .............. *G01F 19/00* (2013.01); *A47L 13/50* (2013.01)

(58) Field of Classification Search
CPC ................................. G01F 19/00; A47L 13/50
USPC .......................................................... 73/427
See application file for complete search history.

(56) References Cited

U.S. PATENT DOCUMENTS

| | | | | |
|---|---|---|---|---|
| 2,195,133 A * | 3/1940 | Nevin | ..................... | G01F 19/00 222/148 |
| 4,230,238 A * | 10/1980 | Wilson | ..................... | G01F 19/00 141/98 |
| 5,662,249 A * | 9/1997 | Grosse | ................. | B65D 47/147 141/319 |
| 6,109,487 A * | 8/2000 | Hashimoto | ............. | A47J 43/27 222/109 |
| 6,209,595 B1 * | 4/2001 | Granath | ................... | B65D 1/18 141/331 |
| 6,728,990 B1 * | 5/2004 | Jones | ...................... | A47L 13/51 15/260 |
| 9,320,404 B2 * | 4/2016 | Gornik | ..................... | A47L 13/20 |
| 9,828,230 B2 * | 11/2017 | Ismail | ................. | B67D 3/0041 |
| 9,950,933 B1 * | 4/2018 | Rinker | ................... | A47G 19/12 |

(Continued)

OTHER PUBLICATIONS

"Dispensers for Dilution Control", Diversey; htts://www.diversey.com/diversey-care/diversey-products/dilution-dispensing/dilution-control-dispensers; Website visited Oct. 25, 2018; Unknown publication date but prior to filing of present application.

*Primary Examiner* — Jamel E Williams
(74) *Attorney, Agent, or Firm* — Philip H. Burrus, IV

(57) ABSTRACT

A graduated mop liquid measurement pitcher includes a base, a plurality of sidewalls extending from the base to a liquid receiver, and a cylindrical handle. A first sidewall expands as it extends distally from the base to a waist and then tapers inward as it extends from the waist to the liquid receiver. A second sidewall and a third sidewall are substantially planar. A first plurality of demarcations is disposed along the second sidewall and indicate a number of mop heads of a first type capable of being saturated by a volume of liquid held by the graduated mop liquid measurement pitcher. A second plurality of demarcations is disposed along the third sidewall and indicates another number of mop heads of a second type capable of being saturated by another volume of liquid held by the graduated mop liquid measurement.

20 Claims, 9 Drawing Sheets

(56) References Cited

U.S. PATENT DOCUMENTS

| | | | |
|---|---|---|---|
| 2005/0011261 A1* | 1/2005 | Lyon | G01F 19/00 73/427 |
| 2014/0252039 A1* | 9/2014 | Jennings | B65D 23/10 222/158 |
| 2016/0069725 A1* | 3/2016 | Prommel | G01F 19/002 73/427 |
| 2017/0188728 A1 | 7/2017 | Votolao | |

* cited by examiner

GRADUATED MOP LIQUID MEASUREMENT PITCHER WITH EASILY GRASPABLE HANDLE

CROSS REFERENCE TO PRIOR APPLICATIONS

This application claims priority and benefit under 35 U.S.C. § 119(e) from U.S. Provisional Application No. 62/752,741, filed Oct. 30, 2018, which is incorporated by reference for all purposes.

BACKGROUND

Technical Field

This disclosure relates generally to containers, and more particularly to liquid-holding containers.

Background Art

Containers are frequently used to transport liquids. It would be advantageous to have an improved container.

Figure 1:
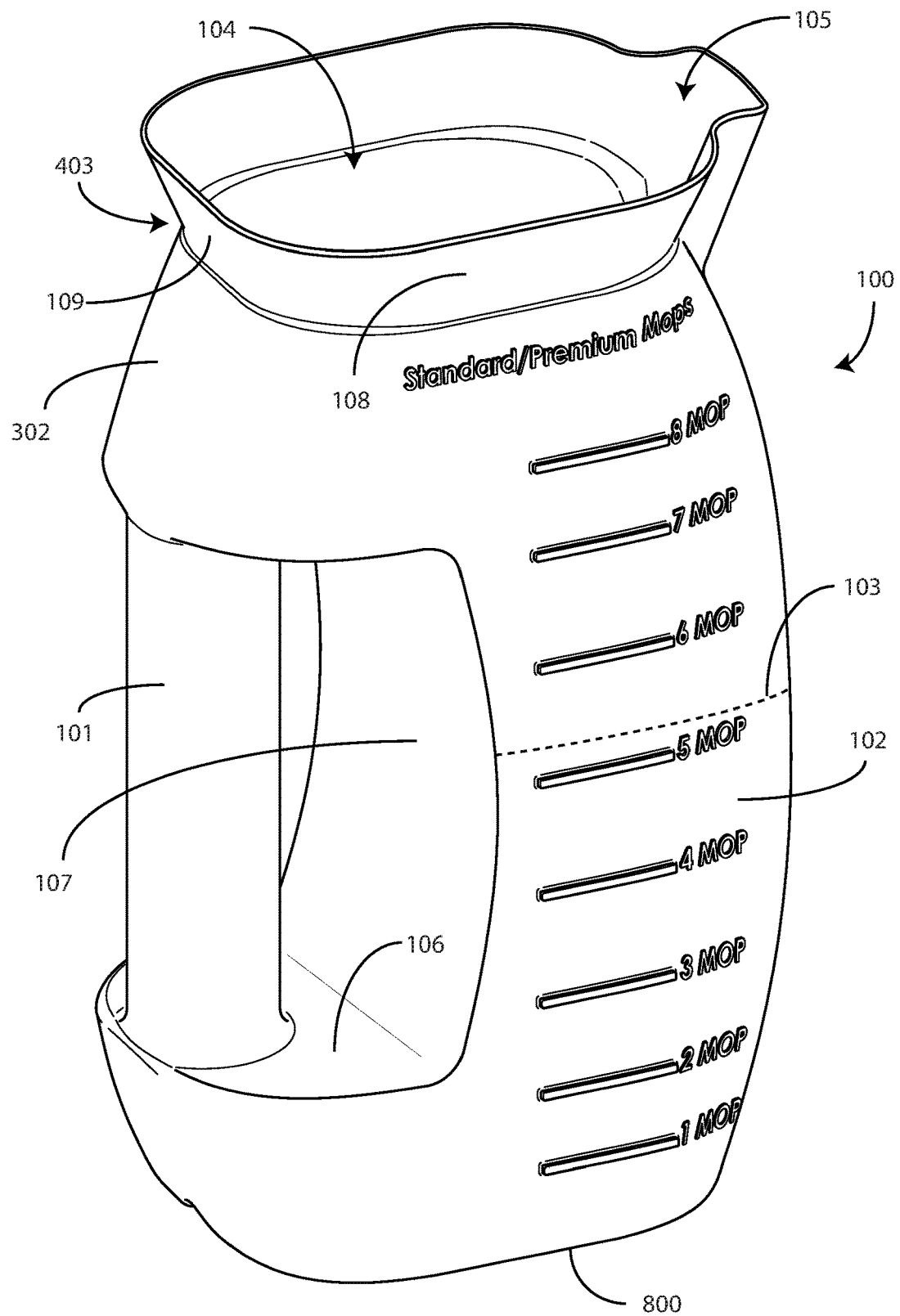
FIG. 1 illustrated a first perspective view of one explanatory mop liquid measurement pitcher in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an improved container, configured as a pitcher in one embodiment, that allows for quick and accurate measurement of an amount of liquid to be applied to a predefined number of mop heads. Embodiments of the disclosure contemplate that mopping systems have improved from the days when the only mop available was a cotton-based, string mop. The advent of microfibers has led the charge in improving mopping technologies, as the microfiber mop head has transformed the way that floors and other surfaces are cleaned.

Microfibers are synthetic fibers having a thickness of less than one denier. Microfibers are used to make non-woven, woven, and knitted textile products. Microfibers are also used in the manufacture of modern mop heads. A microfiber mop head can be attached to a lightweight, maneuverable, often rectangular, head from which a shaft or other handle extends. After absorbing an amount of cleaning solution, the microfiber mop head is used to mop a floor or other horizontal surface. Cleaning personnel frequently favor microfiber mop heads due to the fact that they make cleaning more efficient. Microfiber mops are also generally less tiring to use than are conventional, heavy, cotton string mops. Further, microfibers tend to be much more absorbent than are their cotton string counterparts.

Embodiments of the disclosure further contemplate that it can be difficult for cleaning personnel to know exactly how much liquid to apply to a microfiber mop head prior to using it to mop. With conventional string mops, the mop is saturated and then wrung, perhaps with the aid of a mechanical press mounted on a bucket. Microfiber mop heads are different, in that when they are properly used they are generally not wrung. Instead, when they absorb a proper amount of solution, they can be used for mopping without wringing.

Since the amount of liquid needed to saturate the microfiber mop head is generally unknown, cleaning personnel frequently just "soak" a microfiber in a basin of cleaning solution on a work cart. After employing this less than optimal solution, a user must then hand-wring the microfiber mop head prior to attaching it to the mop.

This inefficient usage technique is problematic for several reasons. First, it wastes cleaning solution. These cleaning solutions can be expensive, as they frequently include not only cleansers, but antimicrobial and antibacterial chemicals as well. When too much cleaning solution is dispensed, overages must be discarded, thereby increasing overall cleaning costs. Second, the chemicals can be hazardous if not handled properly. Some facilities use chemicals such butoxyethanol, quarternary ammonium compounds, and phenols as cleansing agents. These chemicals can cause respiratory irritation and skin burns if improperly handled. Should someone wring a mop saturated with these chemicals without wearing gloves, skin irritation can occur.

Embodiments of the disclosure provide a container, configured as a pitcher in one or more embodiments, that ensures a correct amount of cleaning solution is dispensed into another container, such as a bucket, for a predefined number of mop heads. Moreover, containers described in accordance with embodiments of the disclosure fit perfectly within commonly used dispensing system dispensers, such as the J-Fill.sup.™ QuattroSelect.sup.™ dispensing machines manufactured by Diversey, Inc.

Embodiments of the disclosure ensure the correct amount of cleaning solution that can be absorbed by a predetermined number of mop heads is used in the mopping process. Not only does this eliminate the need for handwringing mop heads, but it also results in a more economical process due to the fact that cleaning solution is not wasted. Further, containers configured in accordance with one or more embodiments of the disclosure offer more environmentally friendly cleaning solutions due to the fact that excess cleaning solution need not be discarded into public sewage systems.

In one or more embodiments, a graduated mop liquid measurement pitcher comprises a base and a plurality of sidewalls extending distally from the base to a liquid receiver. A first sidewall expands outward from the base to a waist of the graduated mop liquid measurement pitcher and then tapers inward to the liquid receiver. A second sidewall expands outward from the base and terminates at a lower-handle engaging ledge. A cylindrical handle extends from the lower-handle engaging ledge to an upper handle-engaging ledge. The second sidewall tapers inward from the upper handle-engaging edge to the liquid receiver.

In one or more embodiments, a first plurality of demarcations is disposed along a sidewall. The first plurality of demarcations indicates a number of mop heads of a first type capable of being saturated by a volume of liquid held by the graduated mop liquid measurement pitcher and filled to one demarcation of the first plurality of demarcations. In one or more embodiments, a second plurality of demarcations is disposed along another sidewall. The second plurality of demarcations indicates another number of mop heads of a second type capable of being saturated by another volume of liquid held by the graduated mop liquid measurement pitcher and filled to another demarcation of the second plurality of demarcations.

Illustrating by example, in one embodiment six demarcations are disposed along one sidewall. Each demarcation of the six demarcations indicates a multiple of 225 milliliters of liquid held by the graduated mop liquid measurement pitcher when filled to the each demarcation of the six demarcations. Similarly, in one embodiment eight demarcations are disposed on a second sidewall. Each demarcation of the eight demarcations indicates a multiple of 150 milliliters of liquid held by the graduated mop liquid measurement pitcher when filled to the each demarcation of the eight demarcations.

When improper amounts of water and/or cleaning solution are used in a microfiber mop head during cleaning, the mop heads may be under-saturated. Where this is the case, the mop may fail to deliver a sufficient amount of cleaning solution to the surface to be cleaned. Consequently, the germs and bacteria that may be active along the surface may not receive, for example, enough antimicrobial agents. In environments where cleanliness is imperative, e.g., hospitals and medical offices, this can create a risk of infection or other malady.

By contrast, when a mop head is over-saturated, other problems can arise. If there is too much solution, a user may have to hand wring the mop head, which can result in the issues noted above. Moreover, too much solution can prevent the cleaned surface from drying properly. This is in addition to the economic loss caused by wasting expensive cleaning solutions.

Embodiments of the disclosure therefore advantageously provide solutions to these issues providing a pitcher, which fits nicely into commonly used cleaning solution machines, and which includes a comfortable handle that fits all sizes of hands, that includes a plurality of demarcations disposed along the sidewall. In one or more embodiments, each demarcation comprises an indicator of a number of mop heads capable of being saturated by a volume of liquid disposed in the pitcher having a particular demarcation as an upper limit. Accordingly, when a user wants to saturate three mop heads, rather than performing complex arithmetic in his head, the user simply fills the measurement canister until the liquid reaches the "3 Mops" demarcation. Each demarcation, therefore, provides a simple and convenient mechanism for indicating the exact amount of fluid required because each demarcation corresponds to a fluid level suitable for saturating a predetermined number of mop heads. Embodiments of the disclosure therefore facilitate a simple and clear understanding of just how much liquid is required for a predetermined number of microfiber mop heads. When the process is kept simple, there is little chance of error.

Turning now to FIGS. 1-8, illustrated therein is one explanatory graduated mop liquid measurement pitcher 100 that includes a cylindrical handle 101 that is easily graspable. The cylindrical handle 101 is designed to minimize wrist strain.

In one or more embodiments, the graduated mop liquid measurement pitcher 100 is configured to measure a predefined volume of cleaning solution dispensed, for example, from a wall dispenser or a stand-alone dispenser. The graduated mop liquid measurement pitcher 100 can then transfer the cleaning solution to another vessel, such as a bucket, delivering the cleaning solution to the other vessel with an effortless and easily controlled pour.

The graduated mop liquid measurement pitcher 100 can be manufactured in a variety of sizes. Illustrating by example, in one or more embodiments the graduated mop liquid measurement pitcher 100 has a height 401 that is about 225 millimeters. The graduated mop liquid measurement pitcher 100 can be manufactured from a variety of materials as well. In one embodiment, the graduated mop liquid measurement pitcher 100 is manufactured from polyethylene using a blow-molding process. This height dimension and material are illustrative only, as others will be obvious to those of ordinary skill in the art having the benefit of this disclosure.

The graduated mop liquid measurement pitcher 100 includes a base 800 and one or more sidewalls 102,202,302, 602. The sidewalls 102,202,302,602 taper outward as they extend distally from the base 800. The front sidewall 202 expands outwardly to a waist 103. Once the maximum outward extension is reached at the waist 103, the front sidewall then tapers inwardly toward the liquid receiver 104 and corresponding pour spout flue 105.

The rear sidewall 302 also expands outwardly from the base 800, but stops at a lower handle-engaging ledge 106. In one embodiment, the lower handle-engaging ledge 106 is about forty-two millimeters above the base 800.

A cylindrical handle 101 then extends upward from the lower handle-engaging ledge 106. In one or more embodiments, the cylindrical handle 101 has a radius of about thirty millimeters. In one or more embodiments, the cylindrical handle 101 extends upward from the lower handle-engaging ledge 106 by a distance of about 115 millimeters. Embodiments of the disclosure contemplate that while some containers include ergonomic handles designed to fit the contours of a user's hand, containers in accordance with embodiments of the disclosure advantageously are more quickly graspable, especially in wet environments or when a user is wearing gloves, when the handle is configured as a cylinder. As such, the cylindrical handle 101 provides a graspable surface that is quick and reliable, and works to prevent the spillage of liquids from the graduated mop liquid measurement pitcher 100. In one or more embodiments, the cylindrical handle 101 can be textured, or can include surface features, that help a user grasp the sides of the cylindrical handle 101. Such texturing or other surface features can be particularly helpful when the graduated mop liquid measurement pitcher 100 is used in wet environments.

Figure 4:
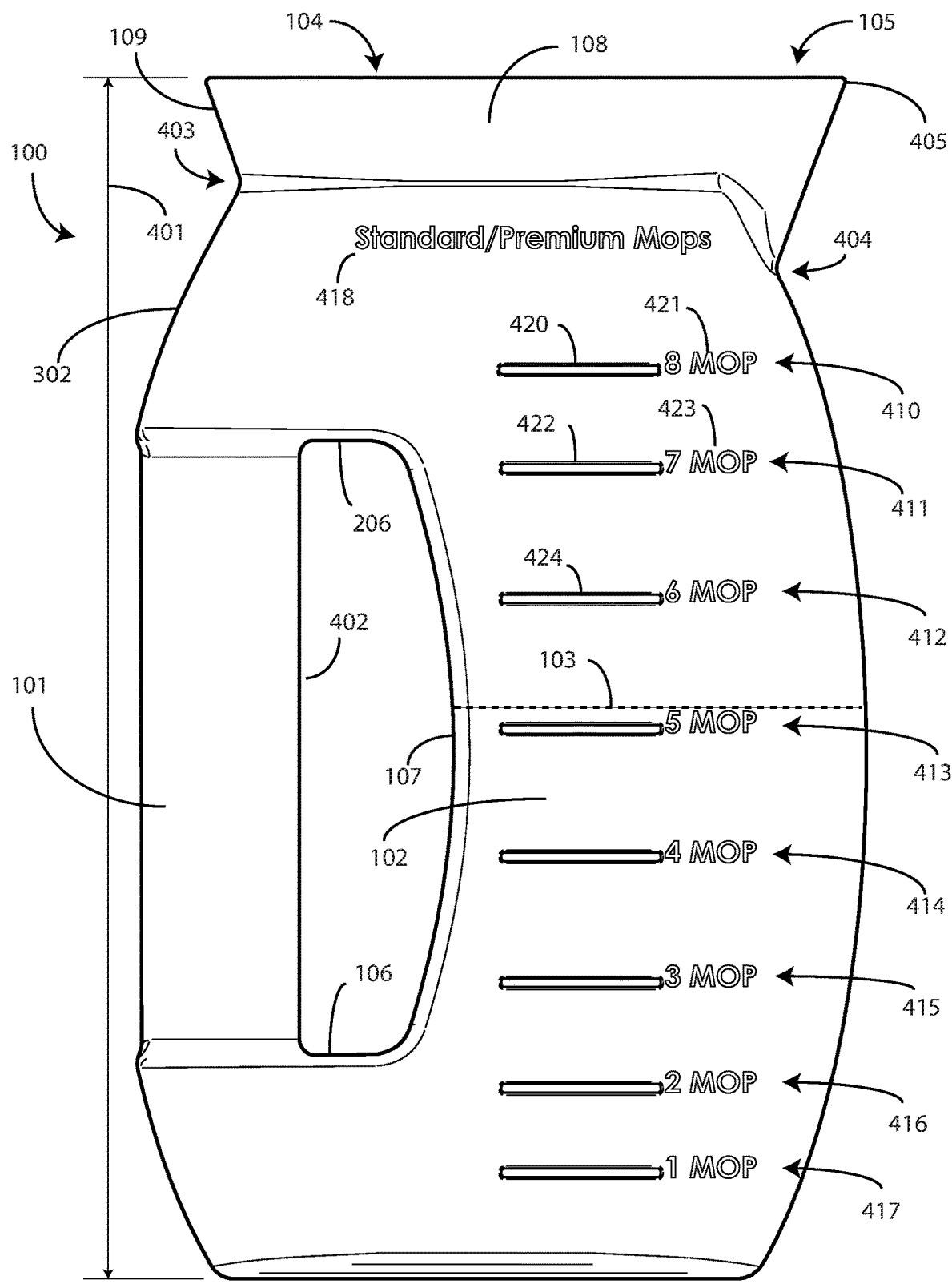
FIG. 4 illustrates a right side elevation view thereof.

In one or more embodiments, the lower handle-engaging ledge 106 extends distally into the graduated mop liquid measurement pitcher 100 from the cylindrical handle 101 to a concave rear surface wall 107. In this illustrative embodiment, the concave rear surface wall 107 is disposed between the cylindrical handle 101 and the fluid receiving interior 700 of the container. As best shown in FIG. 4, in one or more embodiments an interior edge 402 of the cylindrical handle 101, the lower handle-engaging ledge 106, the upper handle-engaging ledge 206, and the concave rear surface wall 107 define a "D" shape in that it defines an interior shape that resembles the interior of the letter D. The concave rear surface wall 107 provides a stop surface for a user's hand or fingers, thereby preventing the unnecessary rotation of a user's wrist about the cylindrical handle 101.

Figure 6:
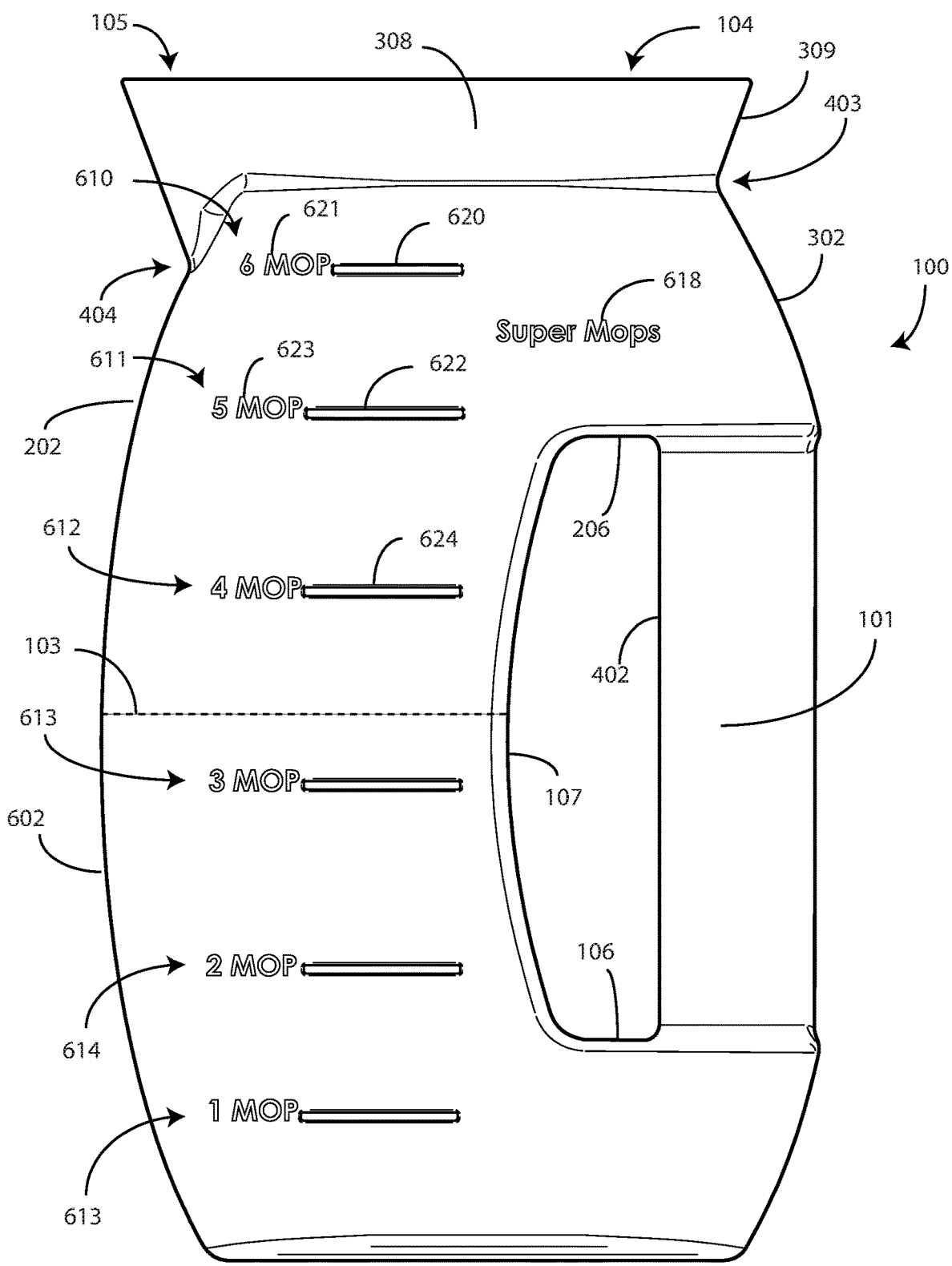
FIG. 6 illustrates a left side elevation view thereof.

The concave rear surface wall 107 extends into the graduated mop liquid measurement pitcher 100, separating a maximum distance from the interior edge 402 of the cylindrical handle 101 at the waist 103 of the graduated mop liquid measurement pitcher 100. In one or more embodiments, this maximum distance from the interior edge 402 of the cylindrical handle 101 occurring at the waist 103 is about 28.5 millimeters. Radiused contours can be added where the cylindrical handle 101 engages the lower handle-engaging ledge 106 or the upper handle-engaging ledge 206. Similarly, radiused contours can be added between the the lower handle-engaging ledge 106 and the concave rear surface wall 107, or alternatively between the the upper handle-engaging ledge 206 and the concave rear surface wall 107, as shown in FIGS. 4, and 6.

In one or more embodiments, the cylindrical handle 101 extends upwardly from the lower handle-engaging ledge 106 until it reaches the upper handle-engaging ledge 206. In one or more embodiments, the distance that the cylindrical handle 101 extends upwardly between the lower handle-engaging ledge 106 and the upper handle-engaging ledge 206 is about 115 millimeters. Other distances will be obvious to those of ordinary skill in the art having the benefit of this disclosure.

From the upper handle-engaging ledge 206, the rear side 103 then tapers back in, or gets narrower, as it extends from the upper handle-engaging ledge 206 to the liquid receiver 104. In one embodiment, the lower handle-engaging ledge 106 is about forty-two millimeters above the base 800. In one or more embodiments, rear side 103 tapers inwardly, causing the graduated mop liquid measurement pitcher 100 to get narrower, as it extends from the upper handle-engaging ledge 206 vertically by a distance of about forty-eight millimeters.

Figure 3:
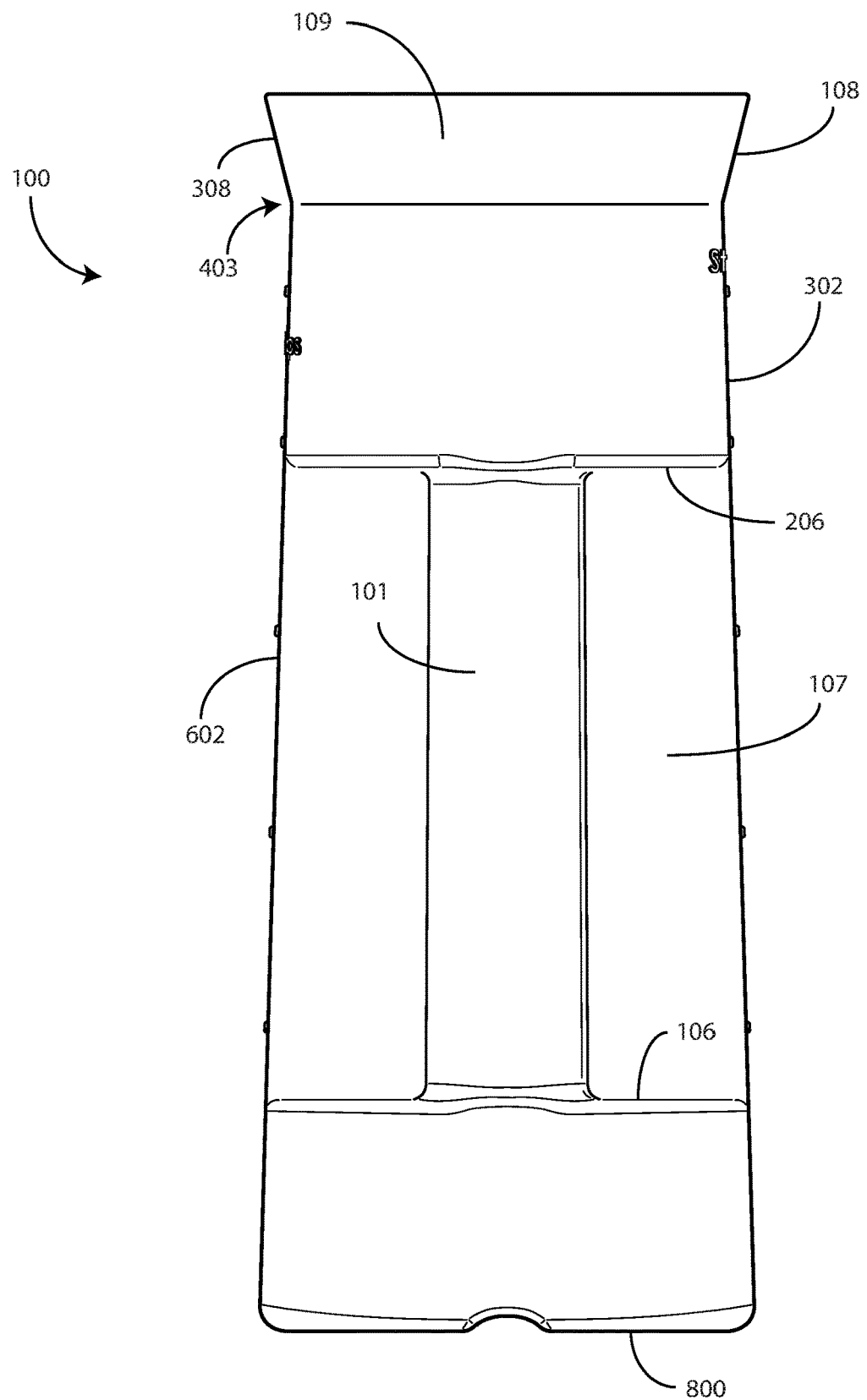
FIG. 3 illustrates a rear elevation view thereof.
Figure 5:
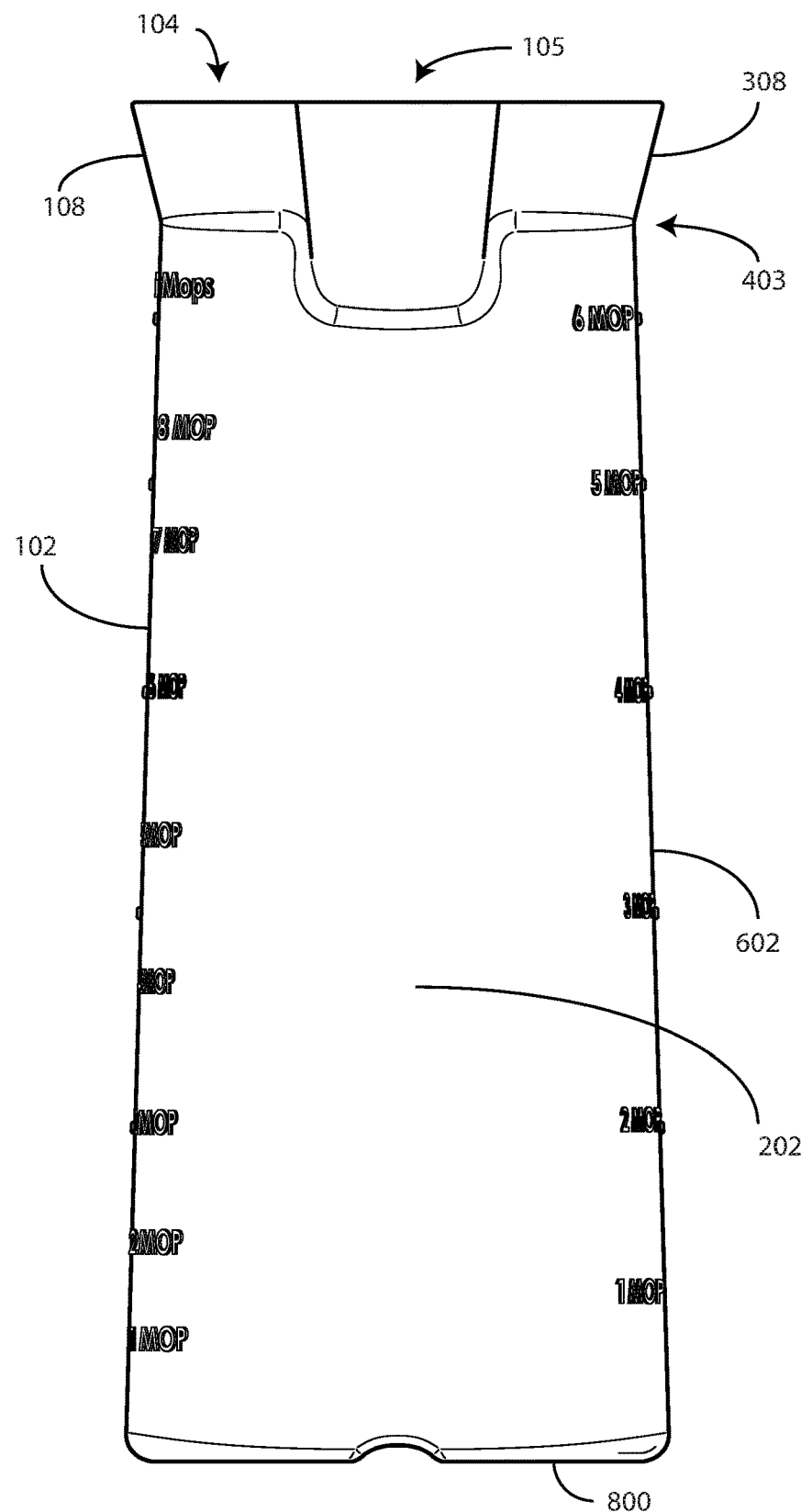
FIG. 5 illustrates a front elevation view thereof.

In contrast to the front sidewall 202 and the rear sidewall 302, in one or more embodiments the left and right sidewalls 102,602 are substantially planar. As best shown in FIGS. 3 and 5, in one or more embodiments these sidewalls 102,602 taper inwardly from the base 800 as they extend distally upward from the base 800 until they reach the liquid receiver 104. In one or more embodiments, the left and right sidewalls 102,602 taper inwardly at an angle of between two and three degrees as they extend upward by a vertical distance of about 205 millimeters to the base of the liquid receiver 104.

From the waist 103, moving upward, the graduated mop liquid measurement pitcher 100 tapers to a neck 403 situated at the base of the liquid receiver 104. As best shown in FIGS. 4 and 6, in one or more embodiments the pour spout flue 105 traverses the neck 403. Said differently, in one or more embodiments a base 404 of the pour spout flue 105 is situated below the neck 403, while a flue edge 405 of the pour spout flue 105 is situated above the neck 403. In this illustrative embodiment, the pour spout flue 104 allows for easy pouring due to the fact that the contoured design, including the outward opening of the flue edge allows for smooth liquid flow from the pour spout flue 104.

From the neck 403, the liquid receiver 104 and the pour spout flue 105 then taper outwardly as they extend distally above the neck 403. In one embodiment, the pour spout flue 105 extends vertically about thirty-eight millimeters while extending outwardly at an angle of about seventy degrees. By contrast, the sides 108,109,308 of the liquid receiver 104 expand outwardly at an angle of between twenty-five and twenty-six degrees from the neck 403 as they extend vertically a distance of about twenty millimeters from the neck 403.

Figure 7:
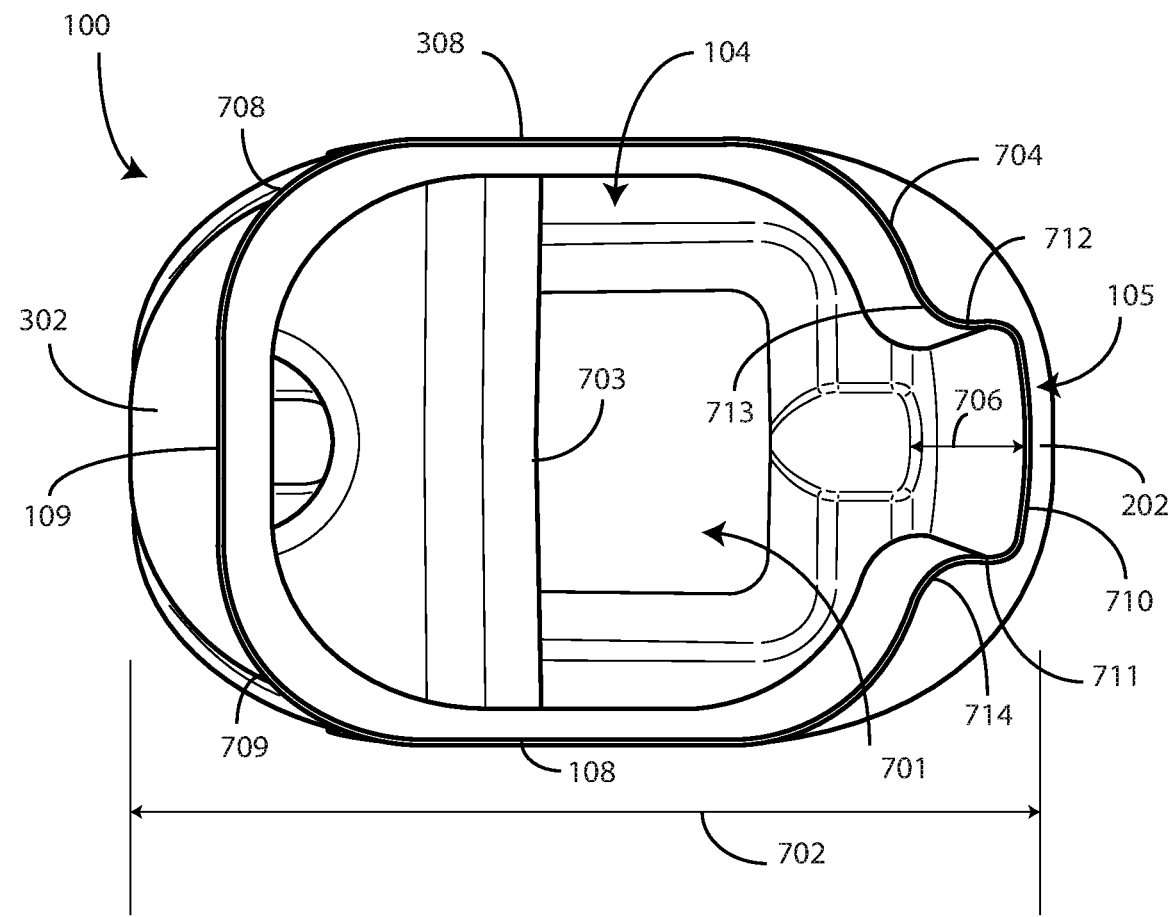
FIG. 7 illustrates a top plan view thereof.

As best shown in FIG. 7, in one or more embodiments each of the sides 108,109,308 of the liquid receiver 104 are substantially straight, and are joined with radiused corners 708,709. In one embodiment, the radiused corners 708,709 have radii of about thirty millimeters. In one embodiment, the liquid receiver 104 has a length of about 105 millimeters. In one or more embodiments, the liquid receiver 104 has a width of about ninety millimeters.

The pour spout flue 105 is centered along a fourth side 704 of the liquid receiver 104 in one or more embodiments. In the illustrative embodiment of FIGS. 1-8, the pour spout flue 105 extends from the fourth side 704 of the liquid receiver 104 by a distance 706 of between fourteen and fifteen millimeters. The pour spout flue 105 includes a convex flue surface 710 that is bounded on each side by a flue wall 711,712. Convex-out radiused corners can be disposed between the convex flue surface 710 and the flue walls 711,712. In this illustrative embodiment, convex-in radiused corners are then disposed between the flue walls 711,712 and the fourth side 704 of the liquid receiver 104.

Figure 8:
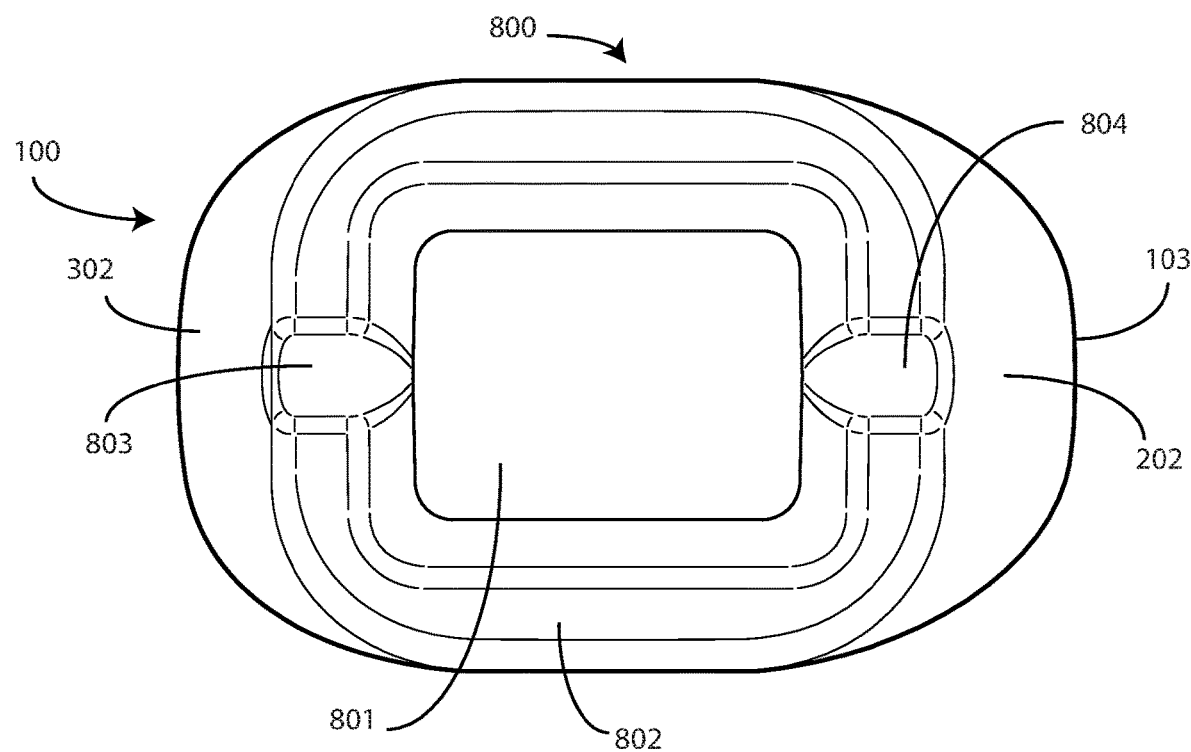
FIG. 8 illustrates a bottom plan view thereof.

As best shown in FIG. 8, in one or more embodiments the base 800 of the graduated mop liquid measurement pitcher 100 includes a punt 801 surrounded by a perimeter edge 802. As used herein, "punt" refers to an indentation in the bottom of a container that resembles a scar in, for example, a glass bottle where the pontil, punty, or punt was broked from a work of blown glass. In this illustrative embodiment, the perimeter edge 802 allows the base 800 to be perimeter weighted when the graduated mop liquid measurement pitcher 100 is filled with liquid to prevent the graduated mop liquid measurement pitcher 100 from falling over.

Situated along the perimeter edge 802 are two liquid transmission channels 803,804 through which liquids caught in the punt 801 can escape or be channeled out from under the graduated mop liquid measurement pitcher 100. In one or more embodiments, these liquid transmission channels 803,804 provide for greater mechanical stability by bifurcating the perimeter edge 802, thereby leaving a partial perimeter edge on each side of the center of gravity. However, the liquid transmission channels 803,804 can provide other functions as well. Illustrating by example, embodiments of the disclosure contemplate that the graduated mop liquid measurement pitcher 100 will be used in wet environments, such as in a cleaning liquid dispenser machine. Accordingly, the graduated mop liquid measurement pitcher 100 may be placed on wet surfaces. Where this is the case, the inclusion of the liquid transmission channels 803,804 allows this liquid to exit from beneath the base 800.

In one or more embodiments, the graduated mop liquid measurement pitcher 100 includes graduated demarcations that serve as indicators corresponding to a volume of cleaning solution suitable for a corresponding number of mops to be saturated. In this illustrative embodiment, the demarcations on the right and left sides of the graduated mop liquid measurement pitcher 100 are different due to the fact that each is intended for use with a different type of microfiber mop head.

Embodiments of the disclosure contemplate that there are different sizes and types of microfiber mop heads. Illustrating by example, there are "standard" microfiber mop heads that are made from polyester and foam, are stitched together, and generally couple to a mop with a hook and loop fastener. Such standard mop heads are about nineteen inches in length, and about four inches in width.

"Premium" mop heads have the same look and feel as the standard mop heads, but are wider, generally having widths of 20.5 inches. They include the same fills as the standard mop heads, but are designed to be commercially laundered. Experimental testing has shown that premium mop heads and standard mop heads generally saturate with the same amount of liquid.

"Super" mop heads include polyamide fills and are generally of a higher quality. Super mop heads are generally about 20.5 inches by four inches. Experimental testing has shown that these mop heads require more liquid to saturate due to their different fills. Such testing has shown that it takes 1.5 times the amount of liquid to saturate a super mop head as it does a standard or premium mop head. Due to this observed fact, the graduations on either side of the graduated mop liquid measurement pitcher 100 are different in one or more embodiments.

Figure 2:
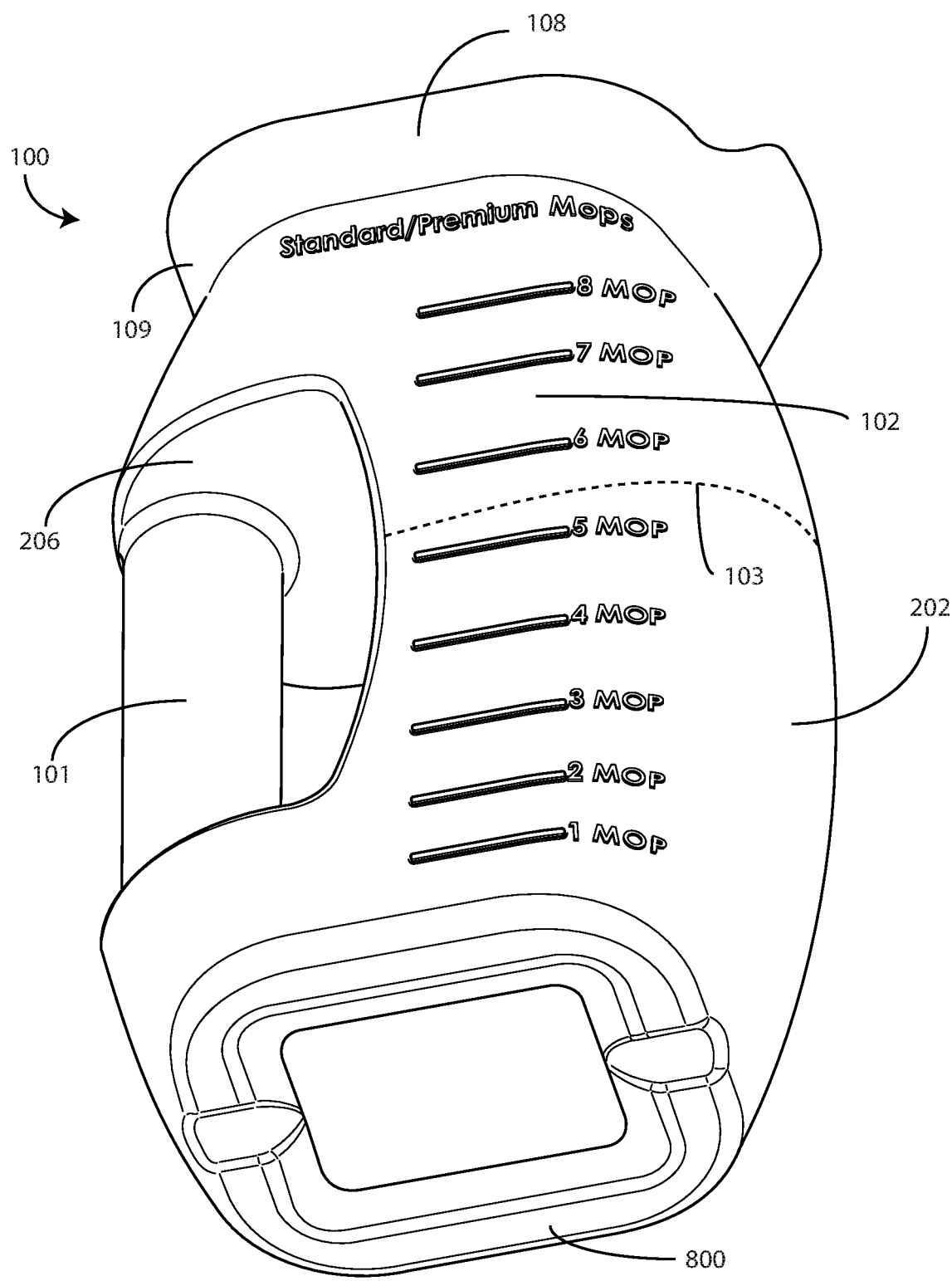
FIG. 2 illustrates a second perspective view thereof.

Beginning with the right side of the graduated mop liquid measurement pitcher 100 shown in FIGS. 1, 2, and 4, in one or more embodiments the right sidewall 102 comprises a plurality of demarcations 410,411,412,413,414,415,416, 417. In one embodiment, each demarcation 410,411,412, 413,414,415,416,417 comprises an indicator of a number of standard or premium mop heads capable of being saturated by a volume of liquid disposed within the graduated mop liquid measurement pitcher 100, when in an upright position, bounded by the base 800 and sidewalls 102,202,303, 602, and having a selected demarcation as an upper limit.

For example, if a user desires to saturate four microfiber mop heads with solution, a volume of liquid disposed in the graduated mop liquid measurement pitcher 100 having the base 800 as its bottom limit, the sidewalls 102,202,302,602 as its outer limit, and demarcation 414 as its upper limit would provide the correct amount of solution that could be absorbed by a standard or premium microfiber mop head. In one or more embodiments, when cleaning a room in a hospital or other health care environment, when cleaning four rooms a new mop is used in each room. Thus, a volume of liquid disposed in the graduated mop liquid measurement pitcher 100 having the base 800 as its bottom limit, the sidewalls 102,202,302,602 as its outer limit, and demarcation 414 as its upper limit would provide the correct amount of solution would provide the correct amount of liquid for four standard or premium microfiber mop heads to clean four rooms. In other embodiments, two mop heads are used in each room. In such an embodiment, a volume of liquid disposed in the graduated mop liquid measurement pitcher 100 having the base 800 as its bottom limit, the sidewalls 102,202,302,602 as its outer limit, and demarcation 414 as its upper limit would provide the correct amount of solution for four standard or premium mop heads to clean two rooms, and so forth.

Accordingly, each demarcation 410,411,412,413,414,415, 416,417 corresponds to a fluid level suitable for saturating a predetermined number of standard or premium mop heads. To confirm that these demarcations 410,411,412,413,414, 415,416,417 are for standard or premium mop heads, and not super mop heads, a standard/premium moniker demarcation 418 is set forth above the demarcations 410,411,412, 413,414,415,416,417.

Both the standard/premium demarcation 418 and the other demarcations 410,411,412,413,414,415,416,417 can be molded into the sidewall 102 of the graduated mop liquid measurement pitcher 100 in one or more embodiments. In the illustrative embodiment of FIGS. 1-8, the standard/premium demarcation 418 and the other demarcations 410, 411,412,413,414,415,416,417 are molded into the sidewall 102 of the side of the graduated mop liquid measurement pitcher 100 such that they protrude outward from an exterior of the sidewall 102 of the side of the graduated mop liquid measurement pitcher 100. In other embodiments, the standard/premium demarcation 418 and the other demarcations 410,411,412,413,414,415,416,417 are molded into the sidewall 102 of the side of the graduated mop liquid measurement pitcher 100 such that they extend inwardly from an exterior of the sidewall 102 of the side of the graduated mop liquid measurement pitcher 100. In still other embodiments, the standard/premium demarcation 418 and the other demarcations 410,411,412,413,414,415,416,417 are printed, etched, painted, carved, inscribed, or otherwise made along the the sidewall 102. Other techniques for creating the standard/premium demarcation 418 and the other demarcations 410,411,412,413,414,415,416,417 in the sidewall 102 will be obvious to those of ordinary skill in the art having the benefit of this disclosure.

In this illustrative embodiment, each demarcation 410, 411,412,413,414,415,416,417 comprises a linear demarcator and the words "X mops," wherein X is a value within a predetermined range. For example, demarcation 410 comprises linear demarcator 420 and the words 421 "8 mops." Similarly, demarcation 411 comprises linear demarcator 422 and the words 423 "7 mops." These demarcations 410,411, 412,413,414,415,416,417 aid users in determining the proper measurements of water and chemicals for a predetermined number of standard or premium microfiber mop heads. The demarcations 410,411,412,413,414,415,416,417 further eliminate questions regarding quantities or volumes required, as well as eliminate the need for complicated unit conversion calculations.

In the illustrative embodiment of FIGS. 1-8, the linear demarcators of the demarcations 410,411,412,413,414,415, 416,417 each have a common length, which is about thirty millimeters. In other embodiments, the linear demacators of the demarcations 410,411,412,413,414,415,416,417 can be configured to be inversely tapered such that each demarcator becomes shorter as the sidewall 102 extends from the neck 403 to the base 800.

In one or more embodiments, the demarcations 410,411, 412,413,414,415,416,417 correspond to a predetermined range of microfiber standard or premium mop heads that can be saturated. In this illustrative embodiment, the predetermined range is 1 to 8 microfiber mop heads, inclusive. Accordingly, filling liquid into the graduated mop liquid measurement pitcher 100 to the first demarcation 417 provides enough liquid to saturate a single standard or premium microfiber mop head, while filling the graduated mop liquid measurement pitcher 100 to the last demarcation 410 provides enough liquid to saturate eight standard or premium microfiber mop heads. The predetermined range of one-to-eight is illustrative only. Other ranges will be obvious to those of ordinary skill in the art having the benefit of this disclosure.

Due to the way that the graduated mop liquid measurement pitcher 100 is configured, in one or more embodiments the demarcations 410,411,412,413,414,415,416,417 are different distances apart. Illustrating by example, in one embodiment demarcation 417 is between eighteen and nineteen millimeters above the base 800. In one embodiment, demarcation 416 is between fifteen and sixteen millimeters above demarcation 417. In one embodiment, demarcation 415 is between twenty and twenty-one millimeters above demarcation 416. In one embodiment, demarcation 414 is between twenty-three and twenty-four millimeters above demarcation 415. In one embodiment, demarcation 413 is between twenty-four and twenty-five millimeters above demarcation 414. In one embodiment, demarcation 412 is between twenty-four and twenty-five millimeters above demarcation 413. In one embodiment, demarcation 411 is between twenty-four and twenty-five millimeters above demarcation 412. In one embodiment, demarcation 410 is between eighteen and nineteen millimeters above demarcation 411.

In one illustrative embodiment, each demarcation 410, 411,412,413,414,415,416,417 corresponds to an increase of six fluid ounces. In one embodiment, the graduated mop liquid measurement pitcher 100 is configured for use with 19"×4" polyester foam standard, or 20.5"×4" polyester foam premium microfiber mop heads. Experimental testing has shown that such mop heads are capable of absorbing six ounces of water and/or cleaning solution and providing desired cleaning results.

Accordingly, in one embodiment each demarcation 410, 411,412,413,414,415,416,417 positioned on the right sidewall 102, i.e., the "standard/premium" side of the graduated mop liquid measurement pitcher 100 is set to six-ounce increments. Consequently, filling the graduated mop liquid measurement pitcher 100 to linear demarcator 422 would add six ounces more to the graduated mop liquid measurement pitcher 100 than would filling to linear demarcator 424. While six-ounce increments are one alternative, others will be readily apparent to those of ordinary skill in the art having the benefit of this disclosure.

The left sidewall 602 of the graduated mop liquid measurement pitcher 100 is configured for super mop heads. As noted above, super mop heads can absorb 1.5 times the water and cleaning solution due to the fact that they include an 80/20 polyester/polyimide fill instead of straight polyester. Consequently, to accommodate either standard/premium mop heads or super mop heads, the "super" side, i.e., sidewall 602 of the graduated mop liquid measurement pitcher 100, is configured differently from the "standard/premium" side of the graduated mop liquid measurement pitcher 100.

As best shown in FIG. 6, in one or more embodiments the left sidewall 602 comprises a plurality of demarcations 610,611,612,613,614,615. In one embodiment, each demarcation 610,611,612,613,614,615 comprises an indicator of a number of super mop heads capable of being saturated by a volume of liquid disposed within the graduated mop liquid measurement pitcher 100, when in an upright position, bounded by the base 800 and sidewalls 102,202,303,602, and having a selected demarcation on the left sidewall 602 as an upper limit.

For example, if a user desires to saturate four super microfiber mop heads with solution, a volume of liquid disposed in the graduated mop liquid measurement pitcher 100 having the base 800 as its bottom limit, the sidewalls 102,202,302,602 as its outer limit, and demarcation 615 as its upper limit would provide the correct amount of solution that could be absorbed by a super microfiber mop head. Accordingly, each demarcation 4610,611,612,613,614,615 corresponds to a fluid level suitable for saturating a predetermined number of super mop heads. To confirm that these demarcations 610,611,612,613,614,615 are for super mop heads, and not super mop heads, a super mop head moniker demarcation 618 is set forth above the demarcations 610, 611,612,613,614,615.

Both the super demarcation 618 and the other demarcations 610,611,612,613,614,615 can be molded into the sidewall 602 of the graduated mop liquid measurement pitcher 100 in one or more embodiments. In the illustrative embodiment of FIGS. 1-8, the super demarcation 618 and the other demarcations 610,611,612,613,614,615 are molded into the sidewall 602 of the side of the graduated mop liquid measurement pitcher 100 such that they protrude outward from an exterior of the sidewall 602 of the side of the graduated mop liquid measurement pitcher 100. In other embodiments, the super demarcation 618 and the other demarcations 610,611,612,613,614,615 can be configured differently, as described above. These different methods include molding such that they extend inwardly from an exterior of the sidewall 602, printing, etching, painting, carving, inscribing, and other techniques.

In this illustrative embodiment, each demarcation 610, 611,612,613,614,615 comprises a linear demarcator and the words "X mops," wherein X is a value within a predetermined range. For example, demarcation 610 comprises linear demarcator 620 and the words 621 "6 mops." Similarly, demarcation 611 comprises linear demarcator 622 and the words 623 "5 mops." These demarcations 610,611,612, 613,614,615 aid users in determining the proper measurements of water and chemicals for a predetermined number of super microfiber mop heads. The demarcations 610,611,612, 613,614,615 further eliminate questions regarding quantities or volumes required, as well as eliminate the need for complicated unit conversion calculations.

In one or more embodiments, the demarcations 610,611, 612,613,614,615 correspond to a predetermined range of super microfiber mop heads that can be saturated. In this illustrative embodiment, the predetermined range is 1 to 6 super microfiber mop heads, inclusive. Accordingly, filling liquid into the graduated mop liquid measurement pitcher 100 to the first demarcation 615 provides enough liquid to saturate a single super microfiber mop head, while filling the graduated mop liquid measurement pitcher 100 to the last demarcation 610 provides enough liquid to saturate six super microfiber mop heads. The predetermined range of one-to-six is illustrative only. Other ranges will be obvious to those of ordinary skill in the art having the benefit of this disclosure.

Due to the way that the graduated mop liquid measurement pitcher 100 is configured, in one or more embodiments the demarcations 610,611,612,613,614,615 are different distances apart. Illustrating by example, in one embodiment demarcation 615 is between twenty-six and twenty-seven millimeters above the base 800. In one embodiment, demarcation 614 is between twenty-eight and twenty-nine millimeters above demarcation 615. In one embodiment, demarcation 613 is about thirty-six millimeters above demarcation 614. In one embodiment, demarcation 612 is between thirtyseven and thirty-eight millimeters above demarcation 613. In one embodiment, demarcation 611 is between thirty-four and thirty-five millimeters above demarcation 612. In one embodiment, demarcation 610 is between twenty-two and twenty-three millimeters above demarcation 611.

In one illustrative embodiment, each demarcation 610, 611,612,613,614,615 corresponds to an increase of nine fluid ounces. In one embodiment, the graduated mop liquid measurement pitcher 100 is configured for use with 19"×4" 80/20 polyester/polyimide super, or 20.5"×4" 80/20 polyester/polyimide super microfiber mop heads. Experimental testing has shown that such mop heads are capable of absorbing nine ounces of water and/or cleaning solution and providing desired cleaning results.

Accordingly, in one embodiment each demarcation 610, 611,612,613,614,615 positioned on the left sidewall 602, i.e., the "super" side of the graduated mop liquid measurement pitcher 100 is set to nine-ounce increments. Consequently, filling the graduated mop liquid measurement pitcher 100 to linear demarcator 622 would add nine ounces more to the graduated mop liquid measurement pitcher 100 than would filling to linear demarcator 624. While nine-ounce increments are one alternative, others will be readily apparent to those of ordinary skill in the art having the benefit of this disclosure.

Techniques for using the graduated mop liquid measurement pitcher 100 are described in commonly assigned U.S. Pat. No. 9,320,404 to Gornik et al., entitled "Mop Measuring Canister and Systems and Method Therefor," which is incorporated herein by reference for all purposes. The graduated mop liquid measurement pitcher 100 can be used with a bucket configured to retain a predetermined number of microfiber mop heads against a base of the bucket.

Illustrating by example, the bucket can include mop head retention members that extend from a side of the bucket inward toward the bucket's interior. The predetermined number of mop heads, which in one embodiment comprises between one and ten mop heads, sit between the mop head retention members and the opposite wall.

To use the components of a system configured in accordance with embodiments of the disclosure, a user first places the predetermined number of mop heads into the bucket. The selected or predetermined number of mop heads can be placed between the mop head retention members and the opposite wall such that they rest against the base of the bucket.

Once this step is complete, a cleaning person obtains a graduated mop liquid measurement pitcher 100 as described above. The person fills the graduated mop liquid measurement pitcher 100 with a cleaning fluid to one of the demarcations corresponding (1) to the selected number of mop heads and (2) to whether the mop heads are premium/standard mop heads or super mop heads. If the selected number of mop heads exceeds the maximum demarcation, the process can be repeated. For example, if the selected number of mop heads is ten, but the maximum demarcation is six, the graduated mop liquid measurement pitcher 100 can be filled to the four mop head demarcation, emptied into the bucket, refilled to the six mop head demarcation, and then again emptied into the bucket.

In this illustrative embodiment, the user fills the graduated mop liquid measurement pitcher 100 by placing it in a dispensing machine such as the J-Fill.sup.™ QuattroSelect.sup.™ dispensing machine manufactured by Diversey, Inc. One places the graduated mop liquid measurement pitcher 100 under a nozzle or within the dispensing machine and causes the fluid to flow into the measurement canister 100.

Once the fluid reaches the demarcation corresponding to the selected number of mops, the user stops the fluid from flowing. Thus, if the user plans to saturate six super mop heads, the user fills the graduated mop liquid measurement pitcher 100 until the fluid reaches the demarcation reciting "6 mops" on the super side of the graduated mop liquid measurement pitcher 100. This provides a quick and simple way to instantly know exactly how much fluid is required for a particular number of mop heads. Moreover, this ensures that all fluid required for proper cleaning will be absorbed, and that none will be wasted.

Figure 9:
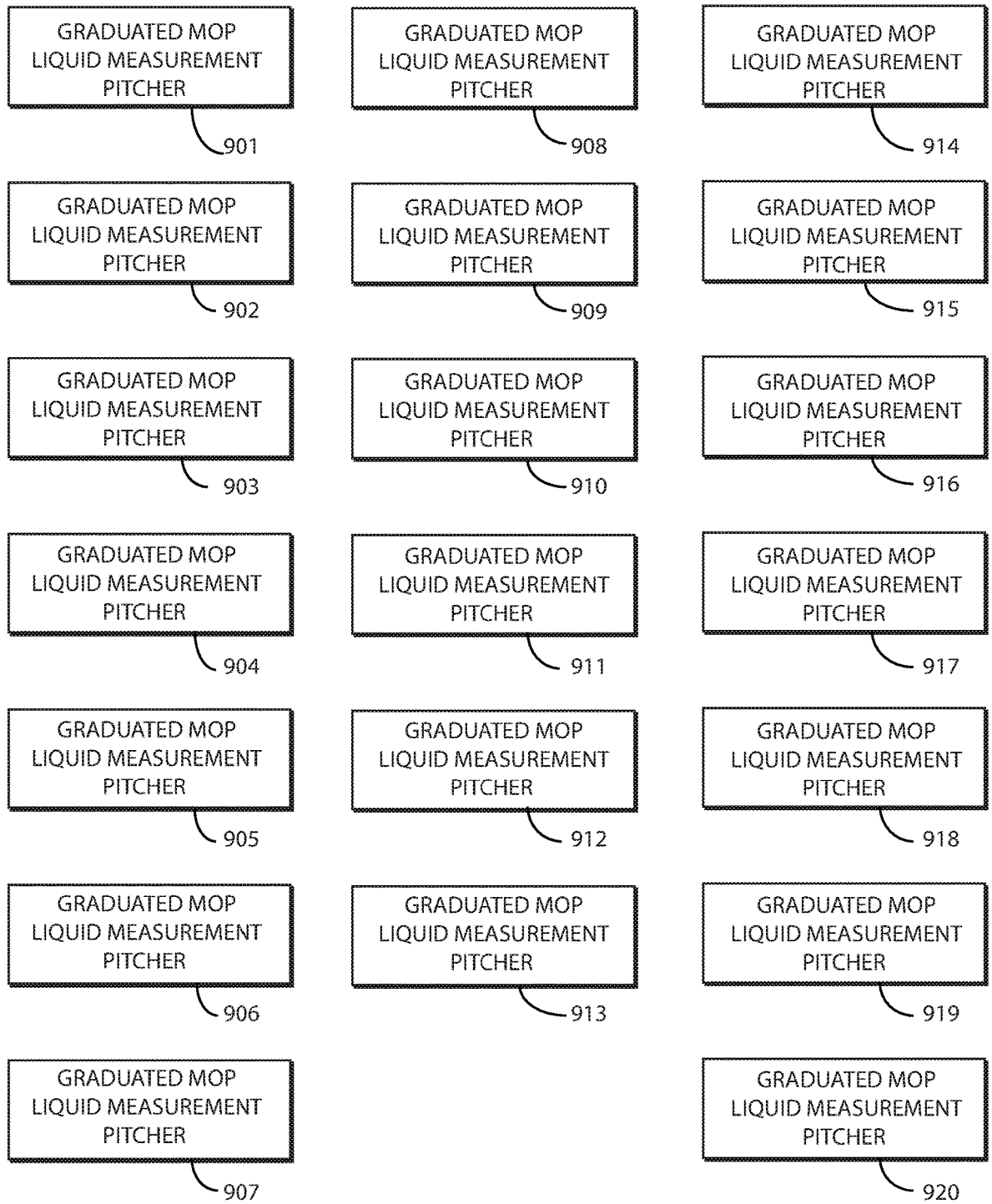
FIG. 9 illustrates various embodiments of the disclosure.

Turning now to FIG. 9, illustrated therein are various embodiments of the disclosure. At 901, a graduated mop liquid measurement pitcher comprises a base, a plurality of sidewalls extending distally from the base to a liquid receiver, and a cylindrical handle. At 901, a first sidewall expands outward from the base to a waist of the graduated mop liquid measurement pitcher and then tapers inward to the liquid receiver. At 901, a second sidewall expands outward from the base and terminates at a lower-handle engaging ledge.

At 901, the cylindrical handle extends from the lower-handle engaging ledge to an upper handle-engaging ledge. At 901, the second sidewall tapers inward from the upper handle-engaging edge to the liquid receiver.

At 902, the graduated mop liquid measurement pitcher of 901 further comprises a concave rear surface wall spanning the lower-handle engaging ledge and the upper handle-engaging ledge. At 903, the lower-handle receiving ledge and the upper handle-receiving ledge of 902 are substantially planar. At 904, the cylindrical handle, the lower-handle engaging ledge and the upper handle-engaging ledge of 902 define a D-shape.

At 905, a third sidewall and a fourth sidewall of 902 are substantially planar. At 906, the third sidewall and the fourth sidewall of 905 taper inward as they extend from the base to a neck situated between the plurality of sidewalls and the liquid receiver.

At 907, the liquid receiver of 906 comprises three substantially straight sides. At 907, the graduated mop liquid measurement pitcher of 906 further comprises a pour spout flue interrupting a fourth side of the liquid receiver. At 908, the pour spout flue of 907 traverses the neck.

At 909, the graduated mop liquid measurement pitcher of 908 further comprises eight microfiber mop fill demarcations disposed along the third sidewall and six microfiber mop fill demarcations disposed along the fourth sidewall. At 910, the graduated mop liquid measurement pitcher of 909 further comprises a "standard/premium" mop head demarcation disposed along the third sidewall. At 911, the graduated mop liquid measurement pitcher of 910 further comprises a "super" mop head demarcation disposed along the fourth sidewall.

At 912, a graduated mop liquid measurement pitcher comprises a base and a plurality of sidewalls extending from the base to a liquid receiver. At 912, a first sidewall expands as it extends distally from the base to a waist and then tapers inward as it extends from the waist to the liquid receiver and a second sidewall and a third sidewall are substantially planar. At 912, a first plurality of demarcations is disposed along the second sidewall indicating a number of mop heads of a first type capable of being saturated by a volume of liquid held by the graduated mop liquid measurement pitcher and filled to one demarcation of the first plurality of demarcations. At 912, a second plurality of demarcations is disposed along the third sidewall indicating another number of mop heads of a second type capable of being saturated by another volume of liquid held by the graduated mop liquid measurement pitcher and filled to another demarcation of the second plurality of demarcations.

At 913, the graduated mop liquid measurement pitcher of 912 further comprises a "standard/premium" mop head demarcation disposed along the third sidewall. At 914, the graduated mop liquid measurement pitcher of 913 further comprises a "super" mop head demarcation disposed along the fourth sidewall. At 915, the fourth sidewall of 914 is interrupted by a lower-handle engaging ledge and a cylindrical handle extending from the lower-handle engaging ledge to an upper handle-engaging ledge. At 916, the graduated mop liquid measurement pitcher of 915 further comprises a concave rear surface wall spanning the lower-handle engaging ledge and the upper handle-engaging ledge.

At 917, a graduated mop liquid measurement pitcher comprises a base and a plurality of sidewalls extending from the base to a liquid receiver. At 917, six demarcations are disposed along a first sidewall, with each demarcation of the six demarcations indicating a multiple of nine ounces of liquid held by the graduated mop liquid measurement pitcher when filled to the each demarcation of the six demarcations. At 917, eight demarcations are disposed on a second sidewall, with each demarcation of the eight demarcations indicating a multiple of six ounces of liquid held by the graduated mop liquid measurement pitcher when filled to the each demarcation of the eight demarcations.

At 918, the base of 917 defines a punt surrounded by a perimeter edge and one or more liquid transmission channels interrupting the perimeter edge. At 919, the graduated mop liquid measurement pitcher of 918 further comprises a "standard/premium" mop head demarcation disposed along the second sidewall. At 920, the graduated mop liquid measurement pitcher of 918 further comprises a "super" mop head demarcation disposed along the first sidewall.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. For example Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A graduated mop liquid measurement pitcher, comprising:
    a base;
    a plurality of sidewalls extending distally from the base to a liquid receiver; and
    a cylindrical handle;
    wherein:
        a first sidewall expands outward from the base to a waist of the graduated mop liquid measurement pitcher and then tapers inward to the liquid receiver; and
        a second sidewall expands outward from the base and terminates at a lower-handle engaging ledge;
        the cylindrical handle extends from the lower-handle engaging ledge to an upper handle-engaging ledge; and
        the second sidewall tapers inward from the upper handle-engaging edge to the liquid receiver.

2. The graduated mop liquid measurement pitcher of claim 1, further comprising a concave rear surface wall spanning the lower-handle engaging ledge and the upper handle-engaging ledge.

3. The graduated mop liquid measurement pitcher of claim 2, wherein the lower-handle receiving ledge and the upper handle-receiving ledge are substantially planar.

4. The graduated mop liquid measurement pitcher of claim 2, wherein the cylindrical handle, the lower-handle engaging ledge and the upper handle-engaging ledge define a D-shape.

5. The graduated mop liquid measurement pitcher of claim 2, wherein a third sidewall and a fourth sidewall are substantially planar.

6. The graduated mop liquid measurement pitcher of claim 5, wherein the third sidewall and the fourth sidewall taper inward as they extend from the base to a neck situated between the plurality of sidewalls and the liquid receiver.

7. The graduated mop liquid measurement pitcher of claim 6, wherein the liquid receiver comprises three substantially straight sides, further comprising a pour spout flue interrupting a fourth side of the liquid receiver.

8. The graduated mop liquid measurement pitcher of claim 7, wherein the pour spout flue traverses the neck.

9. The graduated mop liquid measurement pitcher of claim 8, further comprising eight microfiber mop fill demarcations disposed along the third sidewall and six microfiber mop fill demarcations disposed along the fourth sidewall.

10. The graduated mop liquid measurement pitcher of claim 9, further comprising a "standard/premium" mop head demarcation disposed along the third sidewall.

11. The graduated mop liquid measurement pitcher of claim 10, further comprising a "super" mop head demarcation disposed along the fourth sidewall.

12. A graduated mop liquid measurement pitcher, comprising:
    a base;
    a plurality of sidewalls extending from the base to a liquid receiver, wherein a first sidewall expands as it extends distally from the base to a waist and then tapers inward as it extends from the waist to the liquid receiver and a second sidewall and a third sidewall are substantially planar;
    a first plurality of demarcations disposed along the second sidewall indicating a number of mop heads of a first type capable of being saturated by a volume of liquid held by the graduated mop liquid measurement pitcher and filled to one demarcation of the first plurality of demarcations; and
    a second plurality of demarcations disposed along the third sidewall indicating another number of mop heads of a second type capable of being saturated by another volume of liquid held by the graduated mop liquid measurement pitcher and filled to another demarcation of the second plurality of demarcations.

13. The graduated mop liquid measurement pitcher of claim 12, further comprising a "standard/premium" mop head demarcation disposed along the third sidewall.

14. The graduated mop liquid measurement pitcher of claim 13, further comprising a "super" mop head demarcation disposed along the fourth sidewall.

15. The graduated mop liquid measurement pitcher of claim 14, wherein a fourth sidewall is interrupted by a lower-handle engaging ledge and a cylindrical handle extending from the lower-handle engaging ledge to an upper handle-engaging ledge.

16. The graduated mop liquid measurement pitcher of claim 15, further comprising a concave rear surface wall spanning the lower-handle engaging ledge and the upper handle-engaging ledge.

17. A graduated mop liquid measurement pitcher, comprising:
   a base and a plurality of sidewalls extending from the base to a liquid receiver;
   six demarcations disposed along a first sidewall, each demarcation of the six demarcations indicating a multiple of nine ounces of liquid held by the graduated mop liquid measurement pitcher when filled to the each demarcation of the six demarcations;
   eight demarcations disposed on a second sidewall, each demarcation of the eight demarcations indicating a multiple of six ounces of liquid held by the graduated mop liquid measurement pitcher when filled to the each demarcation of the eight demarcations.

18. The graduated mop liquid measurement pitcher of claim 17, the base defining a punt surrounded by a perimeter edge and one or more liquid transmission channels interrupting the perimeter edge.

19. The graduated mop liquid measurement pitcher of claim 18, further comprising a "standard/premium" mop head demarcation disposed along the second sidewall.

20. The graduated mop liquid measurement pitcher of claim 18, further comprising a "super" mop head demarcation disposed along the first sidewall.

\* \* \* \* \*